Oct. 25, 1966

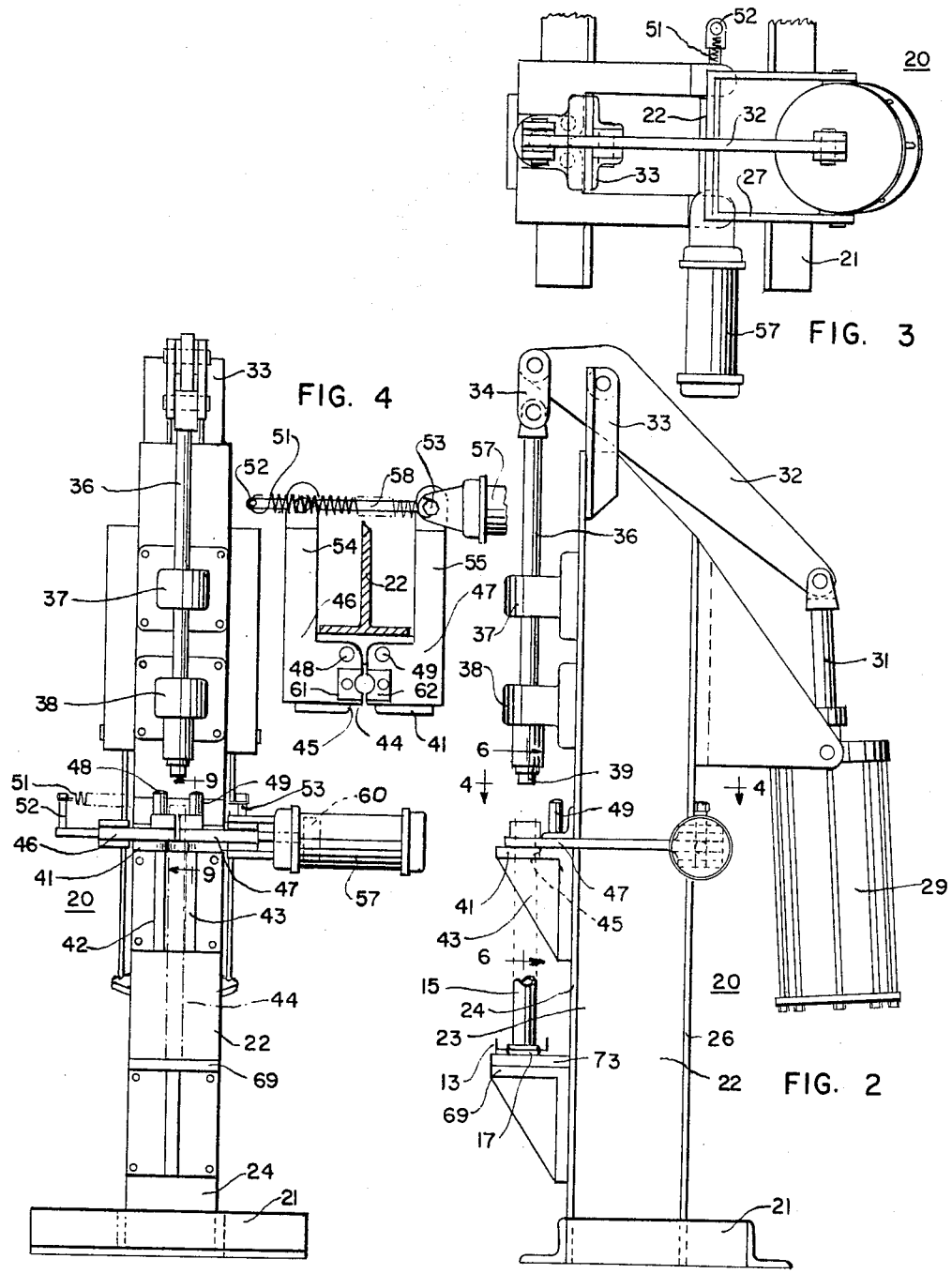

H. B. RICH ETAL 3,280,454

MACHINE FOR FORMING LADDERS

Filed June 3, 1965

INVENTORS
HOWARD B. RICH
ANDREW T. GREEN
BY Pearce & Schaeperklaus

Attorneys.

Oct. 25, 1966   H. B. RICH ETAL   3,280,454
MACHINE FOR FORMING LADDERS
Filed June 3, 1965   3 Sheets-Sheet 3

INVENTORS
HOWARD B. RICH
ANDREW T. GREEN
BY *Pearce Schaeper Klaus*

Attorneys 3,280,454
MACHINE FOR FORMING LADDERS
Howard B. Rich, Carrollton, and Andrew T. Green, Worthville, Ky., assignors to Howard B. Rich, Inc., Carrollton, Ky., a corporation of Kentucky
Filed June 3, 1965, Ser. No. 460,998
4 Claims. (Cl. 29—243.52)

This invention relates to a machine for forming ladders. More particularly, this invention relates to a machine for attaching tubular metal rungs to metal rails of a ladder.

An object of this invention is to provide a machine which forms beads on tubular metal rungs on opposite sides of a rail to firmly assemble the rail and rung.

A further object of this invention is to provide a machine of this type in which a rail is resiliently held in a first position with an end portion of a rung extending through an opening therein while a plunger enters the end of the rung and forms a first bead on one side of the rail and in which the rail then moves lengthwise of the rung against the resilient urging as a second bead is formed on the other side of the rail.

The above and other objects and features of the invention will be apparent to those skilled in the art to which this invention pertains from the following detailed description, and the drawings, in which:

FIG. 1 is a view in front elevation of a ladder forming machine constructed in accordance with an embodiment of this invention, a length of tubing being shown in dot-dash lines in association therewith;

FIG. 2 is a view in side elevation of the machine shown in FIG. 1, a fragmentary portion of a partly formed ladder being shown in association therewith;

FIG. 3 is a top plan view of the machine shown in FIGS. 1 and 2;

FIG. 4 is a view in section taken on the line 4—4 in FIG. 2, jaws of the machine being shown in closed position;

In the following detailed description and the drawings, like reference characters indicate like parts.

Figure 10:
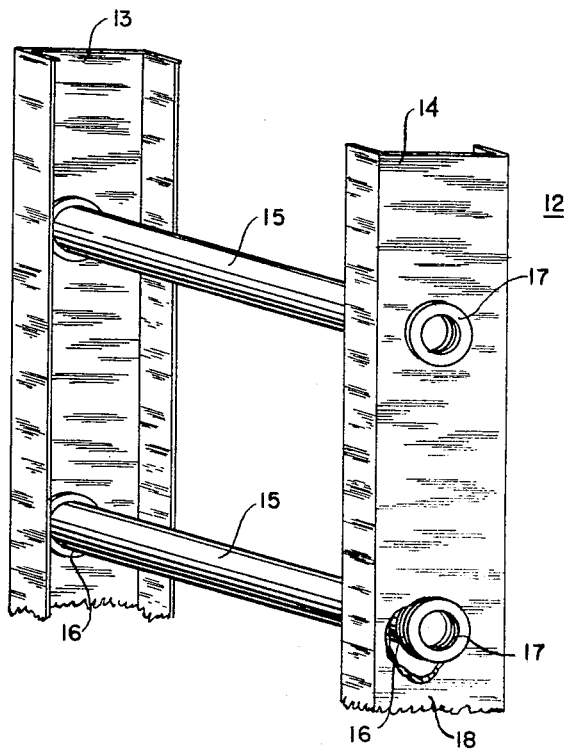
FIG. 10 is a perspective view of a ladder constructed on the machine partly broken away to reveal details of construction.
Figure 9:
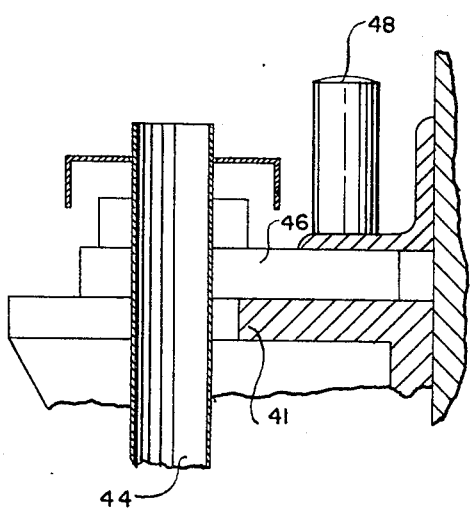
FIG. 9 is a view in section on an enlarged scale taken on the line 9—9 in FIG. 1.

In FIG. 10 is shown a fragmentary portion of a ladder 12 of the form manufactured on the machine of this invention. The ladder 12 includes channel-shaped rails 13 and 14 and tubular rungs 15. Each of the rungs 15 is formed at each end thereof with a pair of beads 16 and 17 with each bead 16 being formed at an inside face of a web 18 of one of the rails and each bead 17 being formed at an outer face of the web 18 of one of the rails so that the beads engage opposite faces of the webs of the rails to hold the rails and rungs in firmly assembled relation.

In FIGS. 1 to 3, inclusive, is shown a machine 20 for forming such a ladder. The machine 20 is constructed in accordance with an embodiment of this invention.

The machine 20 includes a base 21 on which an upright main frame 22 of I-shape in section is mounted.

The main frame 22 includes a web 23 (FIG. 2), a front flange 24, and a rear flange 26. On the rear flange 26 is mounted a channel-shaped frame in which a main cylinder 29 is pivotally supported. A piston rod 31 actuated by the cylinder 29 is pivotally attached to a rocker arm 32 which, in turn, is pivotally mounted on upright bars 33. The bars 33, in turn, are mounted on inner faces of the front flange 24. An upright link 34 connects the rocker arm 32 with a vertical plunger shaft 36. The plunger shaft 36 is slidably mounted in bearings 37 and 38 which are mounted on the front flange 24. A plunger head 39 is mounted on the lower end of the plunger shaft 36 and is moved up and down as the piston rod 31 is driven inwardly or outwardly of the main cylinder 29.

A table 41 is mounted on the front flange 24 below the plunger head 39. The table 41 is supported by spaced ribs 42 and 43 (FIG. 1) having therebetween a space sufficiently wide to receive a length of tubing 44 as indicated in FIG. 1. The table is cut away, as indicated at 45 (FIG. 2), to receive the length of tubing. Jaw members 46 and 47 are pivotally mounted on the table 41 on pivot pins 48 and 49, respectively. The jaw members can swing between the FIG. 5 position where the jaws are open and the FIG. 4 position in which the jaws are closed and are adapted to engage and hold the length of tubing 44 therebetween. The jaws are urged to open position by a tension spring 51 which extends between pins 52 and 53 mounted on extension arms 54 and 55 of the jaw members 46 and 47, respectively. The jaws are closed by action of a cylinder 57 pivotally mounted on the extension arm 55, and a piston rod 58 driven by the cylinder 57 and pivotally connected to the extension arm 54, so that, when fluid under pressure is introduced into the cylinder 57 to the right-hand side of a piston 60 (FIG. 1) therein, the jaws are urged to closed position, to engage the length of tubing 44 as indicated in FIG. 6.

Figure 5:
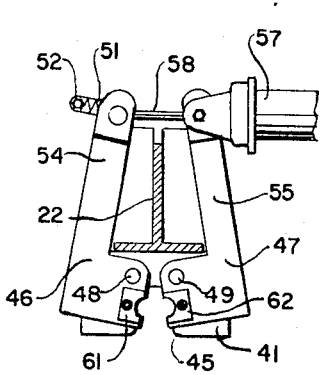
FIG. 5 is a view in section taken on generally the same line as FIG. 4, but showing the jaws in open position.
Figure 6:
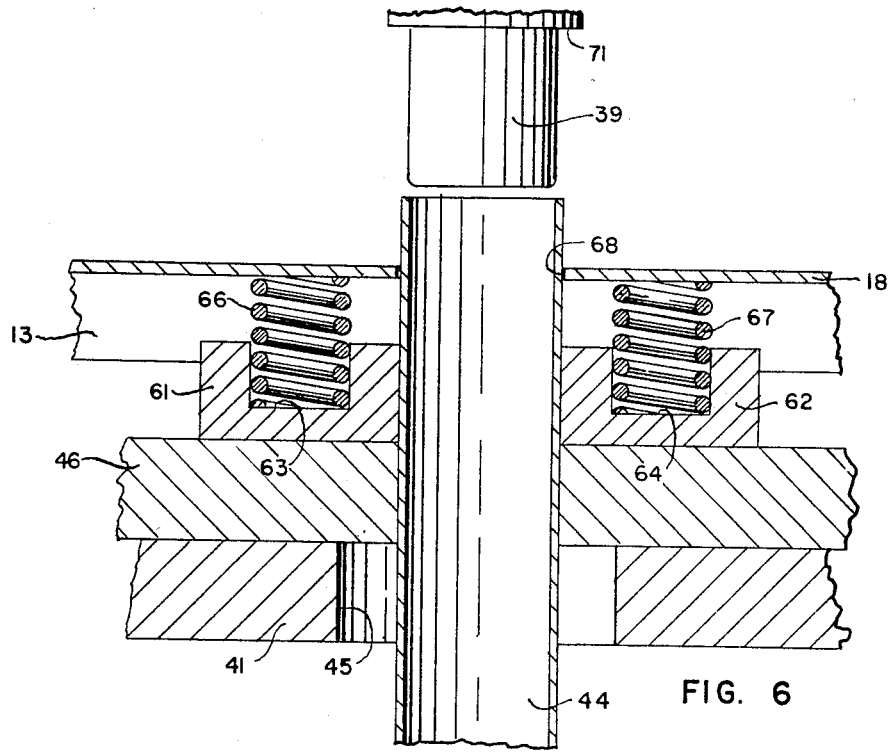
FIG. 6 is a view on an enlarged scale in section taken on the line 6—6 in FIG. 2, an end portion of a length of tubing being shown in association with the machine.

As most clearly shown in FIGS. 4 and 5, the jaw members 46 and 47 carry blocks 61 and 62, respectively, which as shown in FIG. 6, are provided with upwardly opening sockets 63 and 64, respectively. Compression springs 66 and 67 are mounted in the sockets 63 and 64, respectively, and can hold the rail 13 as shown in FIG. 6 with the web 18 thereof spaced above the blocks. The length of tubing 44 is received inside an opening 68 in the web 18. As shown in FIG. 1, the length of tubing 44 is supported on a lower table 69 mounted on the front frame flange 24 and with a short portion of the length of tubing extending above the web 18 as shown in FIG. 6. Then fluid under pressure is introduced into the lower end of the main cylinder 29 (FIG. 2) to urge the rocker arm 32 to swing counterclockwise as shown in FIG. 2, causing the plunger head 39 to be driven downwardly from the FIG. 6 position through the FIG. 7 position to the FIG. 8 position. As the plunger head descends from the FIG. 6 position to the FIG. 7 position, it enters and substantially fills the upper end of the length of tubing 44, and a shoulder 71 (FIG. 6) thereon engages the upper end of the length of tubing so that, as the plunger descends, the upper portion of the length of tubing 44, is formed outwardly into the bead 17, the springs 66 and 67 being of sufficient strength to prevent substantial downward movement of the web 18 until the bead 17 has been formed. Then, as the plunger head 39 descends farther, the springs 66 and 67 are compressed and the bead 16 is formed at the inner face of the web 18, the beads being formed on opposite sides of the web to firmly hold the web. The plunger head substantially fills the interior of the length of tubing 44 inside the beads as the beads are formed to prevent inward collapsing of the metal of the length of tubing.

Figure 7:
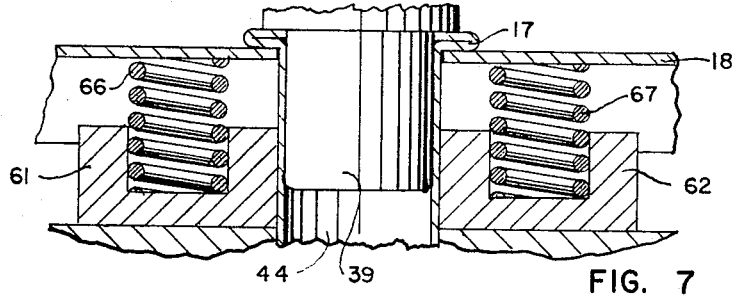
FIG. 7 is a view in section taken on the same line as FIG. 6 but showing the length of tubing after formation of a first bead thereon.
Figure 8:
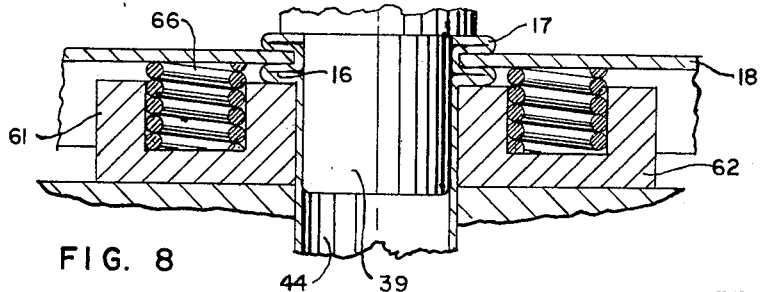
FIG. 8 is a view in section taken on the same line as FIG. 6 but showing the machine in the position after a second bead has been formed on the length of tubing.

The springs 66 and 67 are of sufficient length that a sufficient portion of the length of tubing 44 is normally disposed between the tops of the blocks 61 and 62 and the lower face of the web 18 before descent of the plunger head 39 to form the bead 16 (FIG. 8). The lower table 69 is positioned at such a height that a sufficient portion of the length of tubing 44 extends above the web 18 as shown in FIG. 6 to form the bead 17 (FIG. 7). When beads have been formed on opposite sides of the web 18 of the rail 13, the rail and web can be reversed to the position shown in FIG. 2 with the bead 17 resting on a shim 73 positioned on the lower table 69 to properly position the upper end of the rung 15 (not shown in FIG. 2) for attaching a second rail thereto.

The construction of the ladder forming machine described above and illustrated in the drawings is subject to structural modification without departing from the spirit and scope of the appended claims.

Having described our invention, what we claim as new and desire to secure by Letters Patent is:

1. A machine for attaching a tubular metal rung to a side rail which comprises means for resiliently holding the side rail with a predetermined end portion of the rung projecting through an opening in the rail, means for holding the rung against axial movement, a plunger engageable with an end of the rung, and means for advancing the plunger axially of the rung to form a first bead on the rung on one side of the rail while the resilient holding means maintains the rail in its first position and for further advancing the plunger axially of the rung to form a second bead on the rung on the other side of the rail while the resilient holding means yields to permit movement of the rail with the plunger as the second bead is formed.

2. A machine for attaching a tubular metal rung to a side rail which comprises means for resiliently holding the side rail with a predetermined end portion of the rung projecting through an opening in the rail, means for holding the rung against axial movement, a plunger having an end portion receivable inside the end portion of the rung to substantially fill the end portion of the rung and a shoulder engageable with an end of the rung, and means for advancing the plunger axially of the rung to form a first bead on the rung on one side of the rail while the resilient holding means maintains the rail in its first position and for further advancing the plunger axially of the rung to form a second bead on the rung on the other side of the rail while the resilient holding means yields to permit movement of the rail with the plunger as the second bead is formed.

3. A machine for attaching a tubular metal rung to a side rail which comprises jaws for holding a length of metal tubing, compression spring means mounted on the jaws for resiliently holding the side rail with a predetermined end portion of the length of tubing projecting through an opening in the rail, means for holding the length of tubing against axial movement, a plunger having an end portion receivable inside the end portion of the length of tubing to substantially fill the end portion and a shoulder engageable with an end of the length of tubing, and means for advancing the plunger axially of the length of tubing to form a first bead on the length of tubing on one side of the rail while the spring means maintains the rail in its first position and for further advancing the plunger axially of the length of tubing to form a second bead on the length of tubing on the other side of the rail while the spring means yields to permit movement of the rail with the plunger as the second bead is formed.

4. A machine for attaching a tubular metal rung to a side rail which comprises jaws for holding a length of metal tubing in upright position, compression spring means mounted on the jaws for resiliently holding the side rail in horizontal position with a predetermined end portion of the length of tubing projecting through an opening in the rail, means for holding the length of tubing against downward movement, an upright plunger having a lower end portion receivable inside the end portion of the length of tubing to substantially fill the end portion and a shoulder engageable with an upper end of the length of tubing, and means for advancing the plunger downwardly into engagement with the length of tubing to form a first bead on the length on one side of the rail while the spring means maintains the rail in its first position and for further advancing the plunger downwardly to form a second bead on the length of tubing on the other side of the rail while the spring means yields to permit movement of the rail with the plunger as the second bead is formed.

References Cited by the Examiner

UNITED STATES PATENTS

| | | | |
|---|---|---|---|
| 2,162,731 | 6/1939 | Lyon | 29—243.52 X |
| 3,119,435 | 1/1964 | Greenman | 29—243.52 |
| 3,183,394 | 5/1965 | Hipszer et al. | 29—523 X |

WILLIAM FELDMAN, *Primary Examiner.*

M. S. MEHR, *Assistant Examiner.*